United States Patent [19]

Ueda et al.

[11] 4,221,992
[45] Sep. 9, 1980

[54] SCANNING AREA ROTATION DEVICE FOR AN IMAGE PICKUP TUBE

[75] Inventors: Joji Ueda, Kishiwada; Hiroshi Hisamatsu, Kyoto; Yoshio Takamura, Yokohama, all of Japan

[73] Assignees: Asahi Broadcasting Corporation, Osaka; Tokyo Shibaura Denki Kabushiki Kaisha, Kawasaki, both of Japan

[21] Appl. No.: 935,496

[22] Filed: Aug. 18, 1978

[30] Foreign Application Priority Data

Oct. 24, 1977 [JP] Japan .................... 52/127458

[51] Int. Cl.² ............................................. H01J 31/26
[52] U.S. Cl. ..................................... 315/10; 358/51
[58] Field of Search ................... 315/378, 10; 358/51

[56] References Cited
FOREIGN PATENT DOCUMENTS 1358833 7/1974 United Kingdom .................... 358/51

Primary Examiner—Theodore M. Blum
Attorney, Agent, or Firm—Cushman, Darby & Cushman

[57] ABSTRACT

A scanning area rotation device for an image pick-up tube is provided with a focusing coil enclosing the image pick-up tube and a rotation coil surrounding the vicinity of the target face of the image pick-up tube. A first integration value is calculated by integrating a magnetic flux density, which is developed by the focusing coil, distributing from the target face toward an electron gun of the image pick-up tube with respect to a distance along a tube axis of the image pick-up tube. A second integration value is calculated by integrating a magnetic flux density, which is developed by the rotation coil, distributing from the target face toward the electron gun with respect to a distance along the tube axis. In order to rotate the scanning-area on the target face without off-focusing of the electron beams scanned on the target face, current flowing through the rotation coil has a value allowing the ratio of the second to first integration value to be less than 1/100 in absolute value.

9 Claims, 11 Drawing Figures

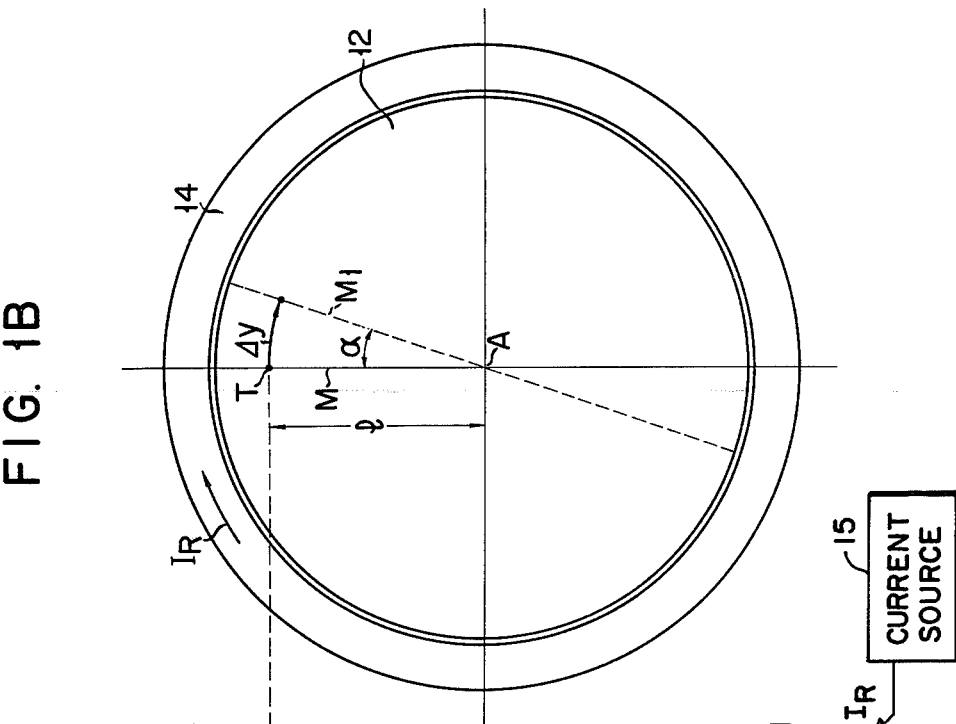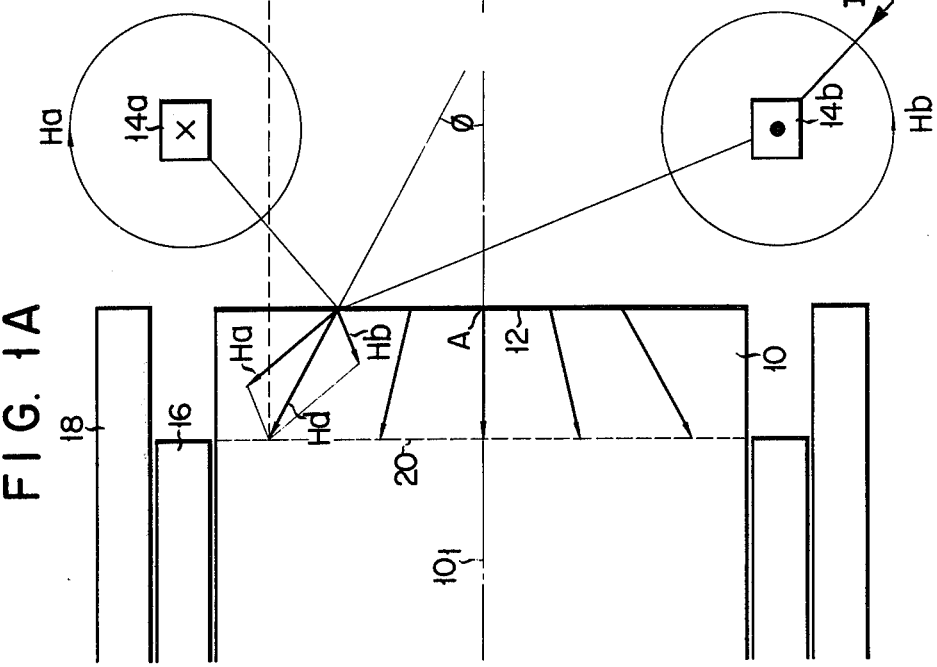

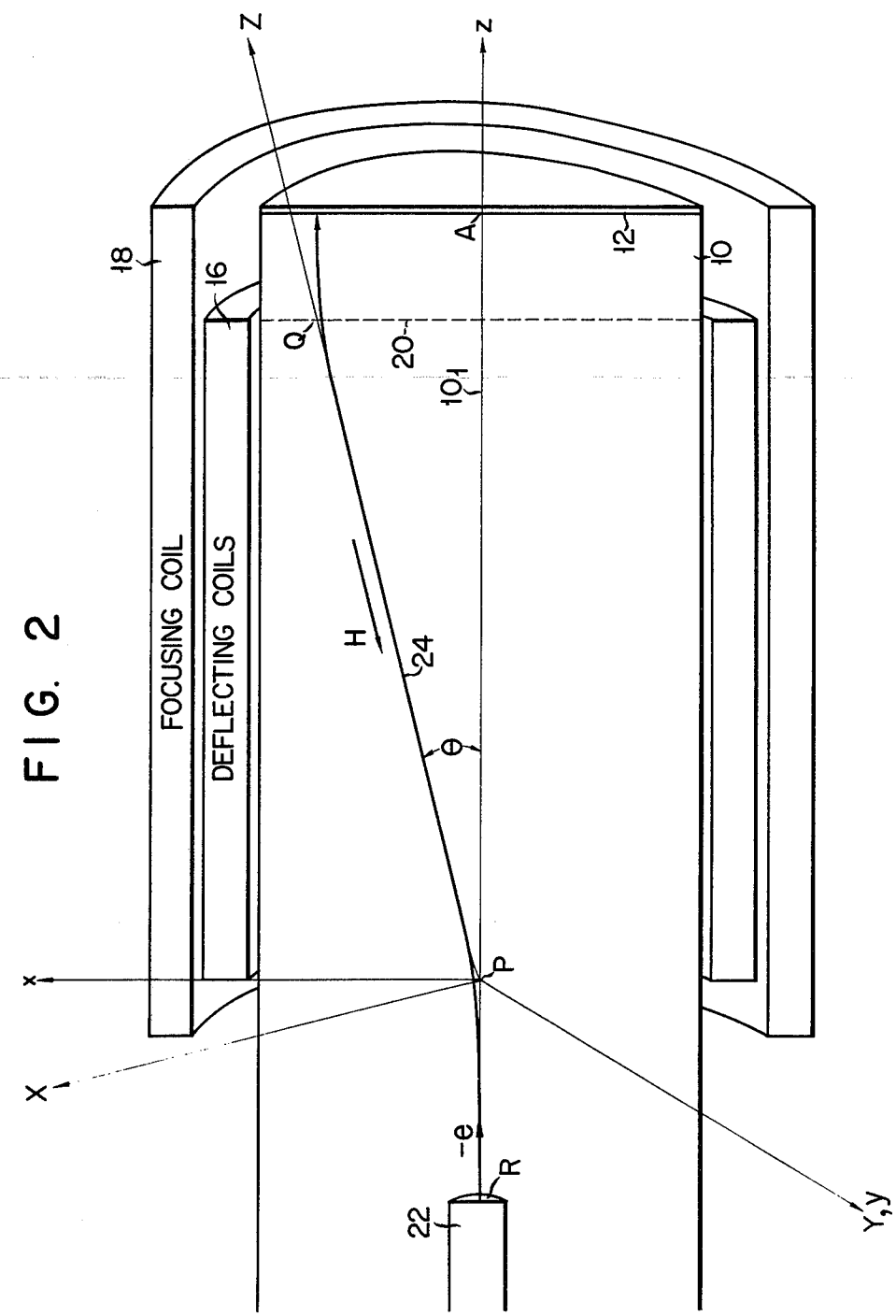

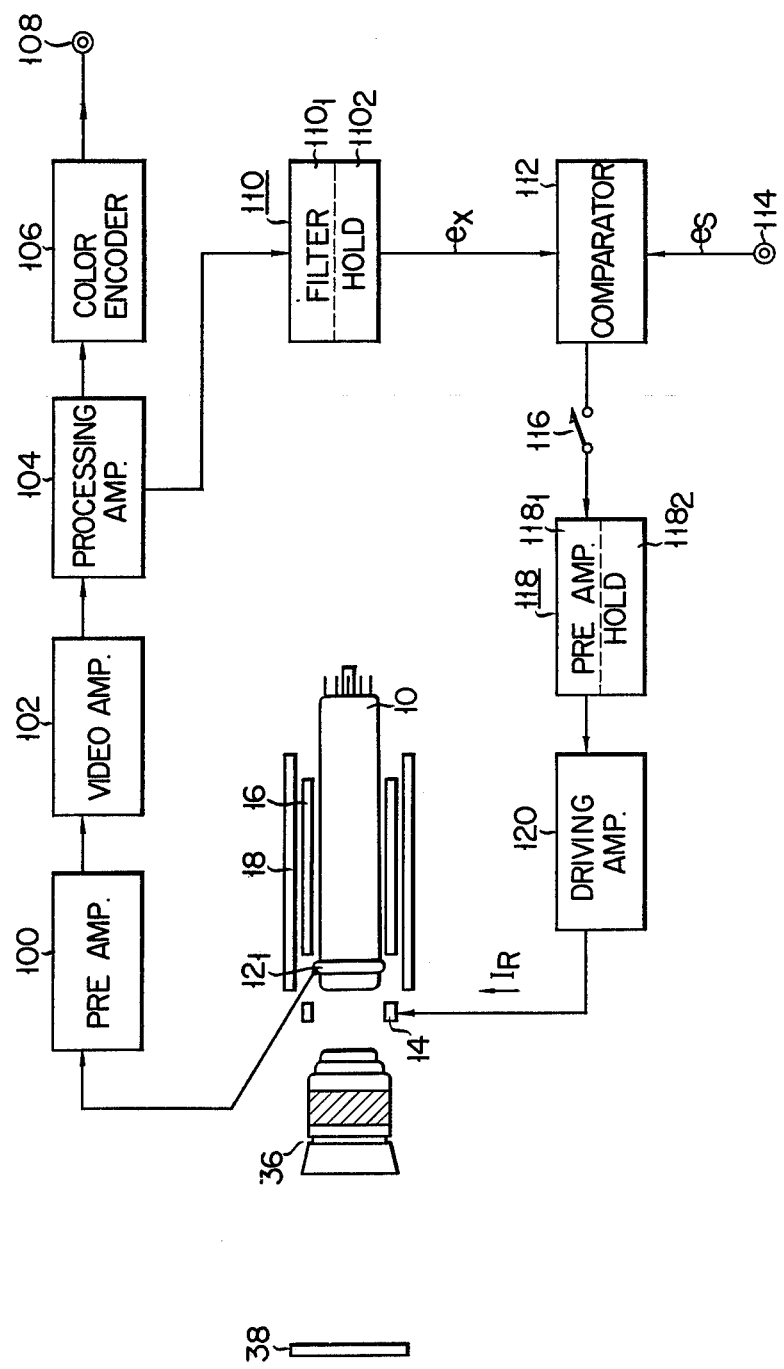

SCANNING AREA ROTATION DEVICE FOR AN IMAGE PICKUP TUBE

BACKGROUND OF THE INVENTION

The invention relates to a device for rotating a raster or a scanning-area on a target face of an image pick-up tube by an electrical means.

By convention, a TV camera using a magnetic focusing and magnetic deflecting type tube such as a plumbicon (trade name) which is an image pick-up tube utilizing a photoconductive effect by using PbO for the target, employs a mechanical means for making a fine adjustment of the inclination of the raster on the target face. A deflection yoke including vertical and horizontal deflecting/focusing coils disposed surrounding the pick-up tube is mechanically rotated about the axis of the image pick-up tube. In a three-tube type color camera, unless red, blue and green rasters are completely aligned to each other, it causes color edging in a picture. For this, it is necessary to perform a precise and fine adjustment of the raster inclination of at least two camera tubes in those three. If an electrical means, in place of the conventional mechanical means, is used, the fine adjustment may readily and automatically be performed.

As already known, the raster may be rotated by changing the current of the focusing coil of the image pick-up tube or the voltage of the third grid. However, when the raster is rotated on the basis of such a principle, off-focusing of electron beams takes place as the raster is progressively rotated. Therefore, when the inclination of the raster is adjusted to an optimum position, there is high possibility that the resolution of an picture picked up by the image pick-up tube is deteriorated.

SUMMARY OF THE INVENTION

Accordingly, an object of the invention is to provide a scanning-area rotation device for an image pick-up tube capable of making electrically a fine adjustment of the inclination of a raster on the target face without off-focusing of electron beams.

To achieve the above object of the invention, there is provided a scanning-area rotation device for an image pick-up tube comprising; a photoconductive type image pick-up tube; focusing magnetic field generating means for forming a first magnetic field to focus electron beams to be scanned on a target face of the image pick-up tube; divergence magnetic field developing means for forming in the vicinity of the target face a second magnetic field to rotate a scanning-area of electron beams to be scanned on the target face; and means for providing an electric signal corresponding to a desired rotation angle of the scanning area to the divergence magnetic field developing means, the magnitude of the electric signal corresponding to a ratio of a second integration value to a first integration value capable of substantially keeping in-focusing of electron beams, the first integration value resulting from a definite integration of a first magnetic flux density of the first magnetic field formed from the target face toward an electron gun of the image pick-up tube with respect to a distance along the tube axis, while the second integration value resulting from a definite integration of a second magnetic flux density of the second magnetic field formed from the target face toward the electron gun with respect to a distance along the tube axis.

In the scanning-area rotation device for an image pick-up tube thus constructed, the first magnetic field for focusing the electron beams is little affected by the second magnetic field for rotating the scanning area and therefore the inclination of the raster on the target face may be finely adjusted without off-focusing.

These and other objects, features and advantages of the invention will become more apparent upon a reading of the following detailed specification and drawings, in which:

BRIEF DESCRIPTION OF THE DRAWINGS

FIG. 1A shows a configuration of a divergence magnetic field Hd developed in the vicinity of the target surface of an image pick-up tube by a rotation coil constituting a scanning-area rotation device for an image pick-up tube according to the invention;

FIG. 1B shows a rotation mode of a scanning line $M_1$ formed on the target surface by the divergence magnetic field Hd shown in FIG. 1A;

FIG. 2 illustrates a movement of an electron beam in the image pick-up tube;

FIG. 10 shows a block diagram for automatically performing a rotation adjusting operation by a scanning-area rotation device for an image pick-up device according to the invention.

DESCRIPTION OF THE PREFERRED EMBODIMENTS

Figure 4:
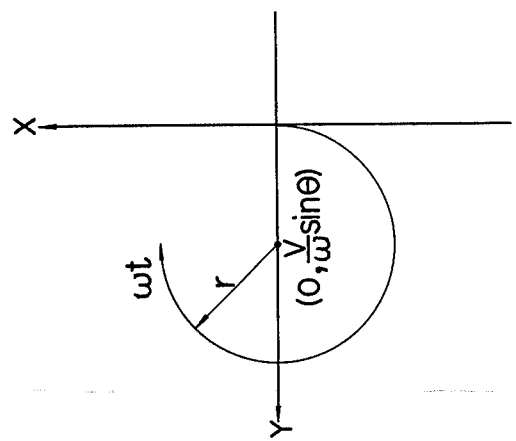
FIG. 4 illustrates a movement of an electron beam in the X–Y plane as viewed from the Z-axis in FIG. 2, caused by a magnetic field H inclined at $\theta$ to z-axis shown in FIG. 3.

On the drawings illustrating preferred embodiments of the invention, like or equivalent parts will be designated by like reference symbols.

Referring now to the drawings and particularly of FIG. 1A, a rotation coil 14 as a divergence magnetic field developing means to rotate the raster is disposed near a target face 12 of an image pick-up type. FIG. 1B shows a rotating state of a scanning line M caused by the coil 14. Around the image pick-up tube 10 are disposed a vertical/horizontal deflecting coil 16 and a focusing coil 18. The coil 14, which is wound in solenoid fashion, is disposed at a slight distance from the target face 12 and is fixed coaxially with the coil 18. When a current $I_R$ fed from a current source 15 flows through the coil 14 the divergence magnetic field is developed along the end face of the coil 16 confronting target face 12. Assume now that the current flowing through the coil 14 is clockwise in direction, in FIG. 1B. In FIG. 1A, at this time, the current through the upper cross section 14a of the coil 14 flows in a direction from obverse to reverse side of the drawing; the current of the lower cross section 14b flows from reverse to obverse side. Upon flowing of the current, a clockwise rotational magnetic field Ha is produced around the cross section 14a; a counter-clockwise rotational magnetic field Hb, around the cross section 14b.

When an effect by the magnetic fields of the coils 16 and 18 is not taken into account, the magnetic field Hd is the resultant magnetic field of the fields Ha and Hb. Since the center of the coil 14 coincides with the axis $10_1$ of the pick-up tube 10, the magnetic field Hd on the tube axis $10_1$ has a direction in parallel with the tube axis $10_1$. As it is more apart from the tube axis $10_1$, the effect by the rotational magnetic field of the cross section 14a or 14b becomes greater. Therefore, the direction of the magnetic field Hd more greatly inclines with respect to the tube axis $10_1$ as it is more distant from the tube axis $10_1$. In other words, a divergence magnetic field symmetrical with respect to the tube axis $10_1$ is thus developed by the coil 14 in the space between the target face 12 and the end face 20 of the coil 16. The angle $\phi$ of the divergence magnetic field Hd to the axis $10_1$ is substantially proportional to the distance l from the axis $10_1$. A force for rotating electron beams travelling toward the target face 12 is greater as it is more distant from the central position A of the target face 12. The divergence magnetic field Hd rotates an electron beam, which originally is to be scanned along a straight line M on the target face 12, in a clockwise direction as indicated by a broken line $M_1$ in FIG. 1B. The raster formed on the face 12 results from gathering of the scanning electron beams so that the raster thus formed may be rotated by the divergence magnetic field.

On the raster rotation by the divergence magnetic field, the inventor experimentally found out the following fact. In the experiment, a plumbicon is used for the image pick-up tube and a 15 turn rotation coil 14 of 3 mm in width and 3 mm thickness is distanced 5 mm out of the target face 12 of the plumbicon 10. The current $I_R$ fed from the source 15 for the rotation coil 14 is 1 amp and flows clockwise as shown in FIG. 1B. It was observed that the raster clockwise rotates approximately 3° and there is no off-focusing.

Let us make a logical analysis about the rotation of the raster. As shown in FIG. 2, in an image pick-up tube assembly of magnetic focusing/deflecting type, an electron beam 24 travels under the influence of a magnetic field H in the tube 10. An electron $-e$, relatively slow speed, emanating from a point R on the end face of an electron gun 22 travels along the axis $10_1$ of the tube 10. In the discussion to follow, the axis $10_1$ is represented by a z-axis, a line originating from the z-axis at a right angle on the end face of the deflecting coil 16 of the side closer to the electron gun 22, is represented by an x-axis and a line perpendicularly originating from the crossing point P of the z- and x- axes on the end face is represented by a y-axis. After passing the point P, the electron $-e$ follows in a helical rotation the line of the magnetic field H produced by the deflecting coil 16 and the focusing coil 18. When the magnetic field H is inclined by an angle $\theta$ to the z-axis, the electron $-e$ leaving the point P has a path inclined similarly.

Figure 3:
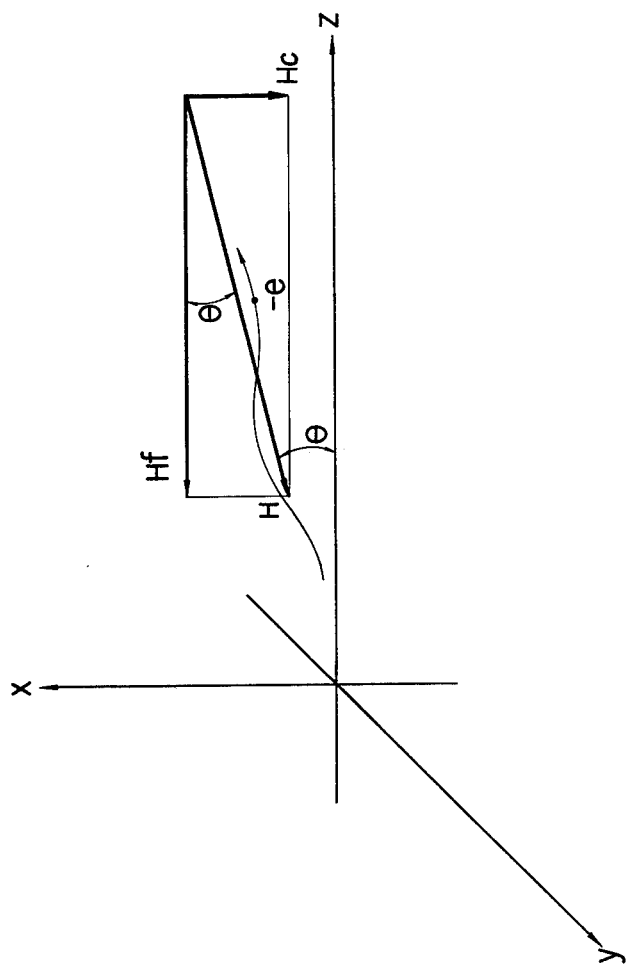
FIG. 3 shows the relationship among magnetic field Hc, Hf and H formed within the image pick-up tube.

FIG. 3 shows a vector diagram for interpreting the movement of the electron $-e$ shown in FIG. 2 from another aspect. In the figure, a magnetic field Hc is a resultant magnetic field of a horizontal magnetic field and a vertical magnetic field, and is in parallel with the x-axis. A magnetic field Hf is a focusing magnetic field in parallel with the z-axis. The magnetic field H is a resultant one having the components Hf and Hc. FIG. 3 exaggeratively depicts the helical movement of the electron $-e$ for the sake of clarity. However, the actual path of the electron may be considered rectilinear along the line of the magnetic field H.

With the formation of such a magnetic field in mind, let us return to FIG. 2 again. The electron $-e$ progresses with an inclination of $\theta$ to the z-axis until it reaches a point Q, that is to say, within the region where the magnetic field Hc caused by the deflecting coil 16 is existent. In the space beyond the point Q, i.e., between the point Q and the target face 12, it can be deemed possible that the magnetic field Hc is zero and the magnetic field Hf is parallel with the z-axis. In such case, the magnetic field H is parallel to the z-axis so that the electron beam 24 is parallel with the same in this space.

As seen from the foregoing description, with fixed values of the magnetic field Hc, the electron $-e$ bombards a corresponding fixed position on the target face 12. When deducing from this, we can readily see that a proper control of the magnitude and direction of the magnetic field Hc can direct the path of the electron $-e$ to strike a desired position on the target face 12. That is, if the magnetic fields of horizontal and vertical are varied with respect to time with fixed periods, a raster may be produced on the target surface 12. However, the raster formed is target surface 12. However, the raster formed is accompanied by a rotation about the z-axis. The raster rotation arises from the fact that the interation between the movement of an electron beam and the magnetic field causes the electron beam to rotate with a given radius.

Let us discuss a motion of the electron $-e$ in the magnetic field H. In this discussion, a z-axis represents the orbit of the electron $-e$ beyond the point P in FIG. 2, a Y-axis uses the y-axis in the previous discussion. An X-axis rectangularly extends from the crossing point P of the Z and Y axes. That is, a new coordinate system (X.Y.Z) results from a counter-clockwise rotation of the coordinate system (x,y,z) by an angle $\theta$ about the y-axis. In the new coordinate system, we have an equation of electron motion $$m \cdot d^2X/dt^2 = +eH \cdot dY/dt \ldots \quad (1a)$$

$$m \cdot d^2Y/dt^2 = -eH \cdot dX/dt \ldots \quad (1b)$$

$$m \cdot d^2Z/dt^2 = 0 \ldots \quad (1c)$$

where $-e$ is electron charge, m electron mass and t is time.

Assume now that, when $t=0$, the electron is at the point P and its velocity is V. Under this initial condition, solving the equations (1a), (1b) and (1c), we have $$X = V/\omega \cdot \sin\theta \sin\omega t \ldots \quad (2a)$$

$$Y = V/\omega \cdot \sin\theta(1 - \cos\omega t) \quad (2b)$$

$$Z = Vt \cos\theta \ldots \quad (2c)$$

where $\omega = e/m \cdot H$. From the equations (2a) and (2b), it will be seen that the motion of the electron on the X–Y plane as seen from the positive side of the Z-axis is as shown in FIG. 4. As shown, an incoming electron beam to the target face 12 advances with a clockwise circular motion of radius $r=V/\omega\cdot\sin\theta$ with center at $(O, V/\omega\cdot\sin\theta)$.

When expressing the equations (2a), (2b) and (2c) in terms of the coordinate system (X, y, z), we have $$x = V/\omega \cdot \sin\theta \cos(\omega t - \sin\omega t) \ldots \quad (3a)$$

$$y = V/\omega \cdot \sin\theta (1 - \cos\omega t) \ldots \quad (3b)$$

$$z = Vt\omega \cos^2\theta - V/\omega \cdot \sin^2\theta \sin\omega t \ldots \quad (3c)$$

Figure 5:
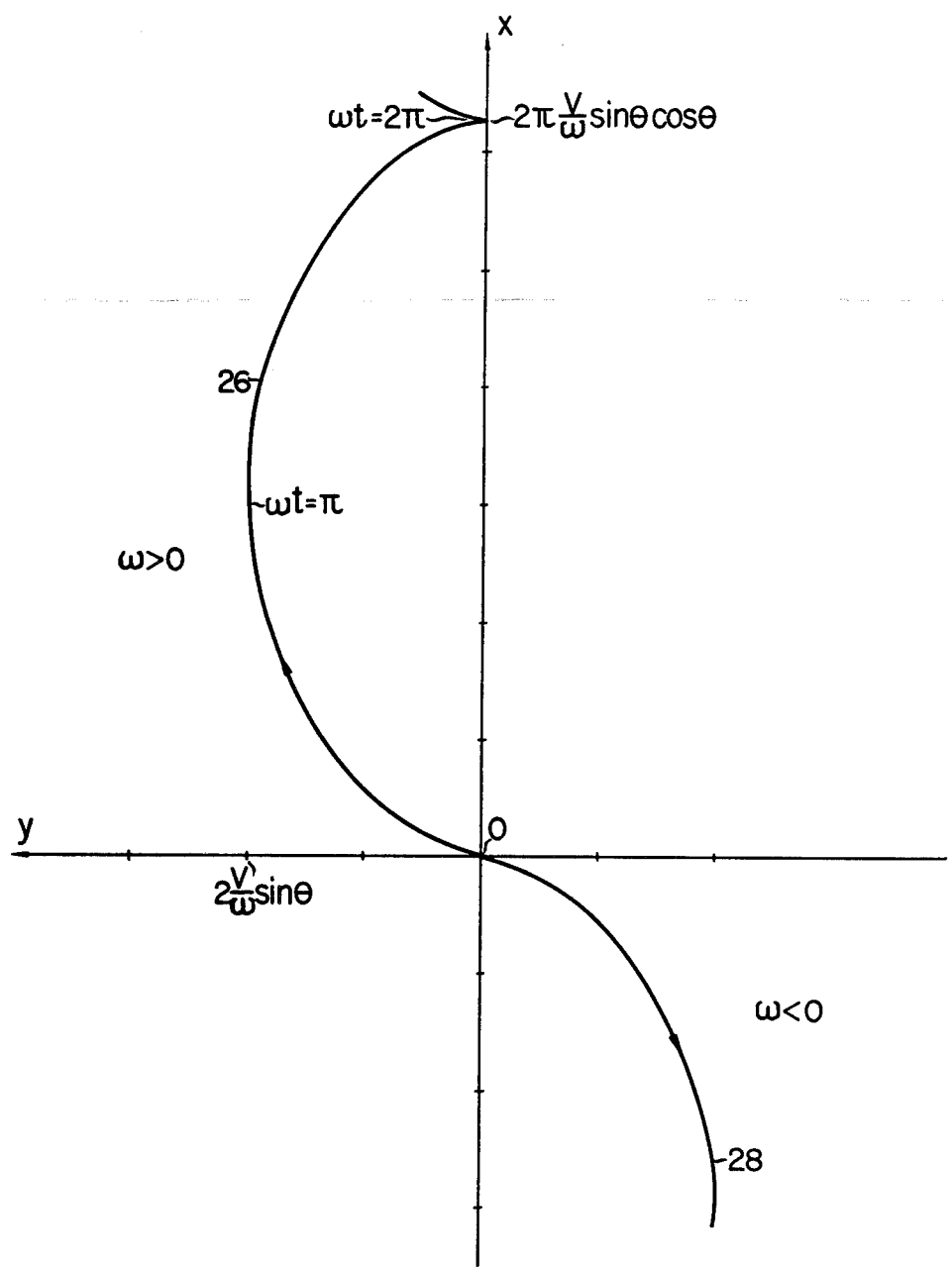
FIG. 5 illustrates a movement of an electron in the x-y plane as viewed from the Z-axis in FIG. 2, when the magnetic field H shown in FIG. 3 is applied.

From the equations (3a) and (3b), the motion of the electron on the x-y plane as seen from the positive side of the z-axis is as shown in FIG. 5. When the magnetic field H is directed toward the point P as shown in FIG. 2, it is assumed that $\omega>0$. In this case, the electron advances along an orbit 26 with respect to time under the influence of the velocity of the electron and the magnetic field H. When $\omega t=0$, the electron is positioned at the origin 0. When $\omega t=\pi$, the displacement of the electron in the y-axis direction is $2\times V/\omega\times\sin\theta$ as maximum value. When $\omega=2\pi$, the displacement of the same returns to zero. At this time, the electron displacement in the direction of the x-axis is $2\pi\cdot V/\omega\cdot\sin\theta\cos\theta$. On the other hand, when $\omega<0$, i.e. the direction of the magnetic field H is inverted, the electron travels along an orbit 28 which is symmetrical with the orbit 26 with respect to the origin 0.

Let us study an electron motion in the vicinity of the point P in FIG. 2, i.e. the origin 0 in FIG. 5. In the region where the y-axial displacement of the electron is very small, the y-axis component $\Delta y$ of the electron displacement is much larger than the x-axis component $\Delta x$. From the equation (3b), the y-axis component $\Delta y$ of the displacement in the vicinity of the point 0 is given $$\Delta y = V\sin\theta\{\omega t - (\omega t)^3/3! + \ldots\} \quad (4)$$

When $\omega t$ and $\theta$ are minute, the equation (4) can be rewritten as $$\Delta y \approx \theta V \omega t \Delta t \ldots \quad (5)$$

The equation (5) shows that the displacement $\Delta y$ is substantially proportional to an angle $\theta$ of the magnetic field H with respect to the z-axis or the tube axis $10_1$.

The present invention depends on the proportional relation between the angle $\theta$ and the displacement $\Delta y$. When comparing the magnetic field H and the angle $\phi$ in FIG. 1A, we can see that the magnetic field Hd also can cause the y-axial displacement to take place and that the y-axial displacement $\Delta y$ is substantially proportional to the angle $\phi$. The angle $\phi$ is substantially proportional to the distance l. Accordingly, if a divergence magnetic field Hd is formed with the angle $\phi$ increasing substantially proportional to the distance l, from the central point A toward its periphery, the raster on the target face 12 may be rotated.

Figure 6:
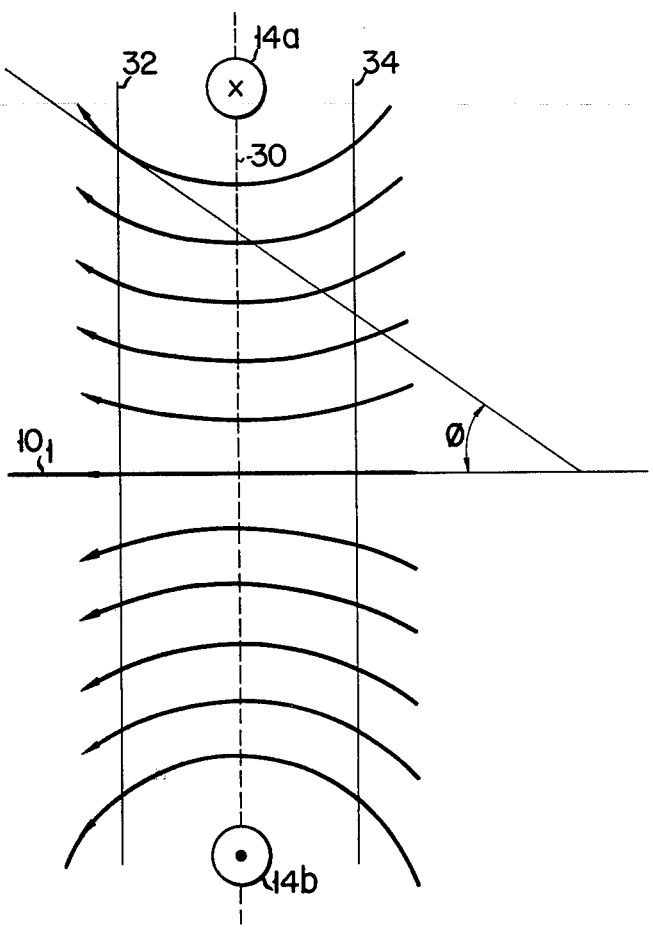
FIG. 6 shows a distribution of the divergence magnetic field developed by the rotation coil.

In FIG. 1A, the focusing magnetic field between the plane 20 and the target face 12 is substantially parallel with the tube axis $10_1$. However, by superposing the divergence magnetic field by the rotation coil 14 on the field between the plane 20 and the face 12, the divergence magnetic field Hd for rotating the raster may be formed near the target face 12. Turning now to FIG. 6, there is shown a distribution of the divergence magnetic field by the rotation coil 14. The angle $\phi$ of the divergence magnetic field to the tube axis $10_1$ is zero entirely over a plane 30 including the coil 14. Accordingly, the magnetic field on the plane 30 is not diverged and ineffective for rotating the raster. However, the magnetic fields on both planes 32 and 34 are diverged and effective for raster rotation. The rotational direction and the magnitude of the divergence magnetic field may readily be controlled by changing the direction and the magnitude of the current $I_R$ supplied to the coil 14. Accordingly, an amount of the rotation $\Delta y$ in FIG. 1B may be changed at will. However, when the current $I_R$ increases and the rotational angle alpha ($\alpha$) of the raster becomes large, there occurs off-focusing and it is impracticable. This fact was confirmed by our experiment.

Figure 7:
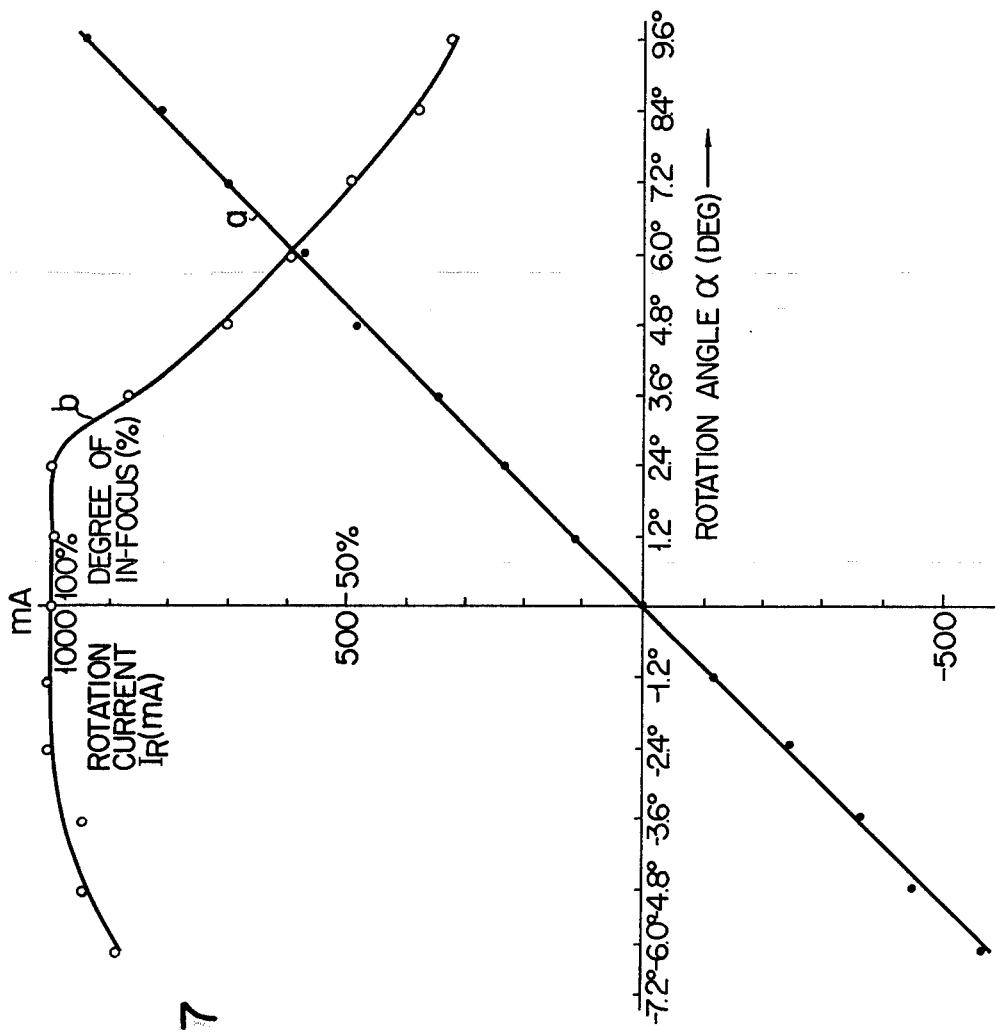
FIG. 7 shows a graph experimentally plotting a relation of a degree of in-focus (%) of an electron beam striking the target surface and a rotation current $I_R$ fed to the rotation coil 14 to a rotation angle alpha ($\alpha$) of a raster.

The relations of the degree of in-focus of incoming electron beams onto the target surface 12 and the current $I_R$ of the rotation coil 14 to the rotation angle alpha ($\alpha$), are experimentally plotted on a graph in FIG. 7. In this experiment, a plumbicon with the diameter of 30 mm was used. In the figure, a curve a designates the variation of the current $I_R$ with respect to the rotation angle alpha ($\alpha$). Another curve b designates the variation of the degree of in-focus with respect to the rotation angle alpha ($\alpha$). The curve a shows that the current $I_R$ is substantially proportional to the rotational angle alpha ($\alpha$). The curve b shows the degree of in-focus, that is to say, how precisely an electron beam is focused on the target plane 12. In the curve b, when the current $I_R$ is zero, i.e. the rotational angle alpha ($\alpha$) is zero, it is so set that the electron beam is most precisely focused on the target face, and at this time the degree of in-focus is set up at 100%. As seen from the graph, when the rotation angle alpha ($\alpha$) exceeds approximately 3°, deterioration of the degree of in-focus, i.e. off-focusing, starts. Therefore, if the raster must be rotated 3° or more, the rotation must be followed by focusing adjustment. This is contradictive to the object of the invention.

Figure 8:
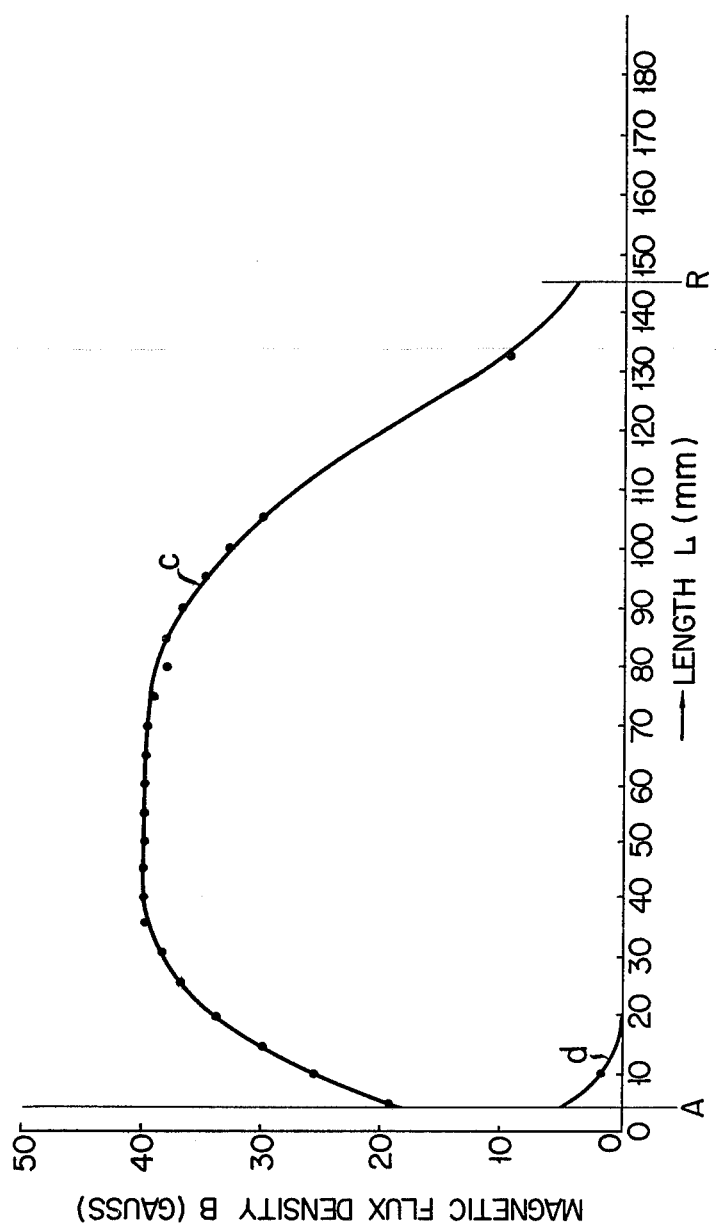
FIG. 8 shows a graph plotting a distribution curve "c" of a flux density distributed axially along the image pick-up tube by the focusing coil and a distribution curve "d" of another flux density distributed axially along the image pick-up tube by the rotation coil.

FIG. 8 illustrates how the magnetic flux density Bf formed in the image pick-up tube 10 by the focusing coil 18 and the magnetic flux density Bd formed in the same by the rotation coil 14 are distributed along the tube axis $10_1$ from the target face 12 toward the electron gun 22. The magnitude of the magnetic flux B is plotted along the vertical coordinate axis and a distance L from the light receiving face of the image pick-up tube to the electron gun is plotted along the horizontal coordinate axis. In the graph, a point A on the horizontal coordinate axis corresponds to the target face 12 and point R to the position of the electron gun 22. A curve c designates a distribution of the magnetic flux density Bf by the coil 18 and a curve d designates a distribution of the magnetic flux density Bd by the coil 14 when the rotation angle alpha ($\alpha$) is at 3°. When integrating the magnetic flux density Bf distributed in the image pick-up tube along the tube axis $10_1$ from the point A to point R with respect to the distance L, we have a first integration value $I_1$ $$I_1 = \int_A^R B_f dL \quad (5)$$

Similarly, when the magnetic flux density Bd is definite-integrated with respect to the distance L in the same range, a second integration value $I_2$ is given $$I_2 = \int_A^R B_d dL \qquad (6)$$

By using measurements shown in FIG. 8, the first and second integrations were calculated and the ratio of $I_2/I_1$ was also calculated to be approximately 1/100. The magnetic flux density $B_d$ may be either positive or negative depending on the rotational direction of the raster. Therefore, the ratio $I_2/I_1$ permitting the magnitude of the rotational angle to fall within 3° is −1/100 to +1/100.

The condition to rotate the raster not accompanied by the off-focusing in practical use is $$I_2/I_1 \lesssim 1/100 \ldots \qquad (7)$$

In the equation (7), the second integration value $I_2$ may be voluntarily changed by the current $I_R$ supplied to the rotation coil 14. Therefore, if the current $I_R$ is finely adjusted within a range satisfying the equation (7), the inclination of the raster on the target face 12 may be fine-adjusted in either clockwise or counter-clockwise direction without off-focusing.

The invention is suitable particularly for a three-tube type color television camera. For example, the raster of a green image pick-up tube is previously set to a correct position, and the rotation coils are disposed near the target faces of blue and red image pick-up tubes. Then, the currents to be fed to the rotation coils are separately adjusted so that the rasters for blue, red and green may be made coincident to each other.

Figure 9:
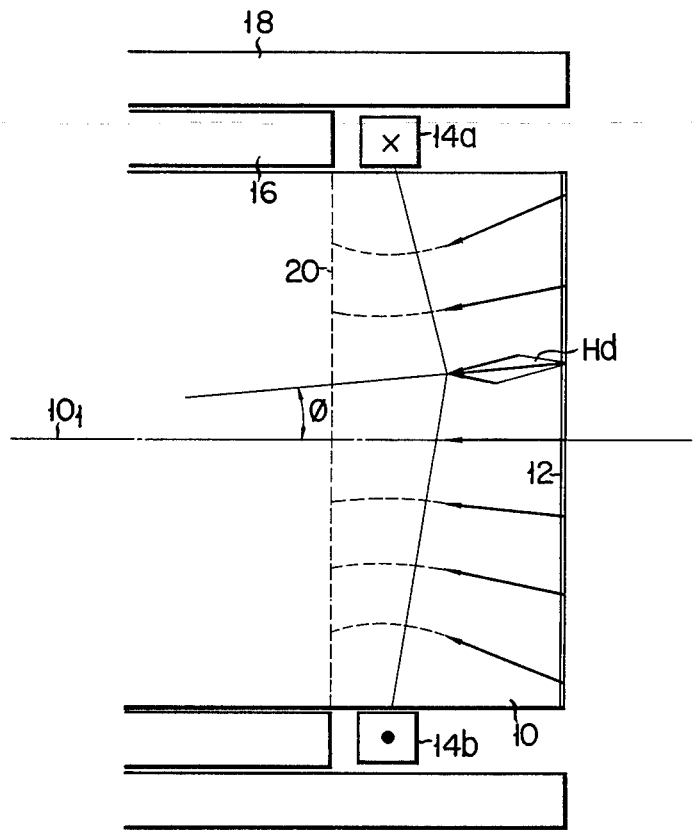
FIG. 9 is a modification of the construction shown in FIG. 1A.

FIG. 9 shows a case where the rotation coil 14 is disposed closer to the electron gun than to the target face 12. In FIGS. 1A and 9, even if the coil 14 and the face 12 are disposed on the same plane, the divergence magnetic field may be formed in the paths of electron beam so that the coil 14 is not necessarily separated from the target surface 12.

For ease of explanation, in FIGS. 1A and 9, the divergence magnetic field Hd is illustrated only between the target face 12 and the plane 20. Actually, however, the magnetic field Hd distributes beyond the plane 20 into the interior of the image pick-up tube. The distribution in the interior contributes to the rotation of the raster. According to the invention, no inconveniences occur only if the divergence magnetic field is a resultant magnetic field of the deflecting coil 16 and the rotation coil 14. The relative disposition of the deflecting coil 16 to the rotation coil 14 is not essential to be invention.

The measuring data in FIGS. 7 and 8 relate to a plumbicon with 30 mm of diameter; however, the same is almost true in the case of vidicon of ⅞ to 2 inches in diameter.

FIG. 10, which will now be described, shows a block diagram of a circuit to automatically perform a fine adjustment of the raster inclination. Assume now that a optical pattern 38 is imaged on the target face of the image pick-up tube 10 through an optical system 36 including a lens assembly. The optical pattern 38 includes a reference mask pattern serving as an index of the inclination of the raster. The reference mark may be included in the optical system. A video signal taken from a target electrode 12₁ of the image pick-up tube 10 is fed to a video amplifier 102 for signal processing through a preamplifier 100. Passing through the video amplifier 102, the video signal is applied to a processing amplifier 104. The processing amplifier 104 processes and amplifies the video signal delivered from the image pick-up tube 10 to form pulse signals for vertical and horizontal scanning operations. The processing by the processing amplifier 104 includes pedestal signal insertion, shading compensation, gamma correction and the like. The video signal taken from the processing amplifier 104 is converted, by a color encoder 106, into a composite video signal, for example and then delivered to a video signal output terminal 108.

The processing signal amplifier 104 also supplies the video signal to a reference signal selection circuit 110. The selection circuit 110 selects and temporarily stores a comparing signal $e_x$, i.e. a signal component corresponding to the reference mark. The selection circuit 110 includes a filter circuit 110₁ and a hold circuit 110₂. The comparing signal $e_x$ derived from the selection circuit 110 is transferred to a comparator circuit 112. To the comparator circuit 112 is further applied a reference signal $e_s$ for the comparing operation from an input terminal 114. The reference signal $e_s$ is a signal for prescribing a rotational angle of the raster in the image pick-up tube 10. For example, when the FIG. 10 construction forms a red video signal, the reference sinal $e_s$ is the reference mark signal of a green or a blue video signal producing device.

An error signal resulting from the comparing operation in the comparator circuit 112 is transferred through a switch 116 to an error amplifier 118. The switch 116 is turned on when it is desired to make an automatic adjustment of the raster inclination. Accordingly, a video signal actually used includes a signal corresponding to the reference mark in a superposed fashion and when the automatic adjustment is constantly performed, the switch 116 is unnecessary. The amplifier 118 includes a preamplifier 118₁ for amplifying the error signal and a hold circuit 118₂ for storing the output signal from the preamplifier 118₁. The error signal taken from the amplifier 118 is transferred to a drive amplifier 120. The drive amplifier 120 supplies the current $I_R$, which is proportional to the error signal, to rotate the raster in a given direction.

With such a circuit construction, the inclination of the raster may automatically be adjusted so as to correspond to the reference signal delivered to the input terminal 114.

Although specific construction have been illustrated and described herein, it is not intended that the invention be limited to the elements and constitutions disclosed. One skilled in the art will recognize that the particular elements or sub-constructions may be used without departing from the scope and spirit of the invention.

What is claimed is:

1. A scanning-area rotation device for an image pick-up tube, comprising:
   a photoconductive type image pick-up tube;
   focusing magnetic field generating means for forming within said image pick-up tube a first magnetic field to focus electron beams to be scanned on a target face of said image pick-up tube;
   divergence magnetic field developing means for forming in the vicinity of the target face a second magnetic field to rotate a scanning area of electron beams to be scanned on the target face, the second magnetic field being symmetrical with respect to a tube axis of said image pick-up tube; and current providing means for providing a current corresponding to a desired rotation angle of the scanning area to said divergence magnetic field developing means, the magnitude of said current corresponding to a ratio of a second integration value to a first integration value capable of substantially keeping the in-focusing of electron beams on the target face, said first integration value resulting from a definite integration of a first magnetic flux density of the first magnetic field formed from the target face toward an electron gun of said image pick-up tube with respect to a distance along the tube axis, while said second integration value resulting from a definite integration of a second magnetic flux density of the second magnetic field formed from the target face toward the electron gun with respect to a distance along the tube axis.

2. A scanning-area rotation device according to claim 1, in which the magnitude of the current fed by said current providing means corresponds to a ratio of said second integration value to said first integration value, which ratio is less than 1/100 in absolute value.

3. A scanning-area rotation device according to claim 1, in which the magnitude of the current fed by said current providing means corresponds to a rotation angle of said scanning-area, which angle is less than 3° in absolute value.

4. An automatic scanning-area rotation control system for an image pick-up tube, comprising:
a photoconductive image pick-up tube;
divergence magnetic field developing means for forming in the vicinity of a target surface of said image pick-up tube a magnetic field to rotate a scanning-area of electron beams to be scanned on the target face, said divergence magnetic field being symmetrical with respect to a tube axis of said image pick-up tube;
reference mark pattern superposing means for superposing a reference mark pattern on a video signal fed from said image pick-up tube, said reference mark pattern serving as an index for an inclination of the scanning-area;
selection means for selecting a comparing signal corresponding to the reference mark pattern from the video signal;
comparator means for comparing the comparing signal derived from said selection means with a reference signal for providing an object value of the inclination of the scanning-area; and
means which amplifies an error signal as a result of the comparison by said comparator means and applies the amplified signal to said divergence magnetic field developing means so as to minimize the error signal.

5. A scanning-area rotation device according to claim 1, in which said photoconductive image pick-up tube is a vidicon.

6. A scanning-area rotation device according to claim 1, in which said divergence magnetic field developing means is a solenoid coil and a plane including the end face of said solenoid coil is parallel to the target face of said image pick-up tube.

7. An automatic scanning-area rotation control system according to claim 4, in which said photoconductive image pick-up tube is a vidicon.

8. An automatic scanning-area rotation control system according to claim 4, in which said divergence magnetic field developing means is a solenoid and a plane including the end face is parallel to the target face of said image pick-up tube.

9. An automatic scanning-area rotation control system according to claim 4, in which said reference mark pattern superposing means includes an optical pattern for providing an optical image corresponding to the reference mark on the target face of said image pick-up tube.

* * * * *